Figure 1:
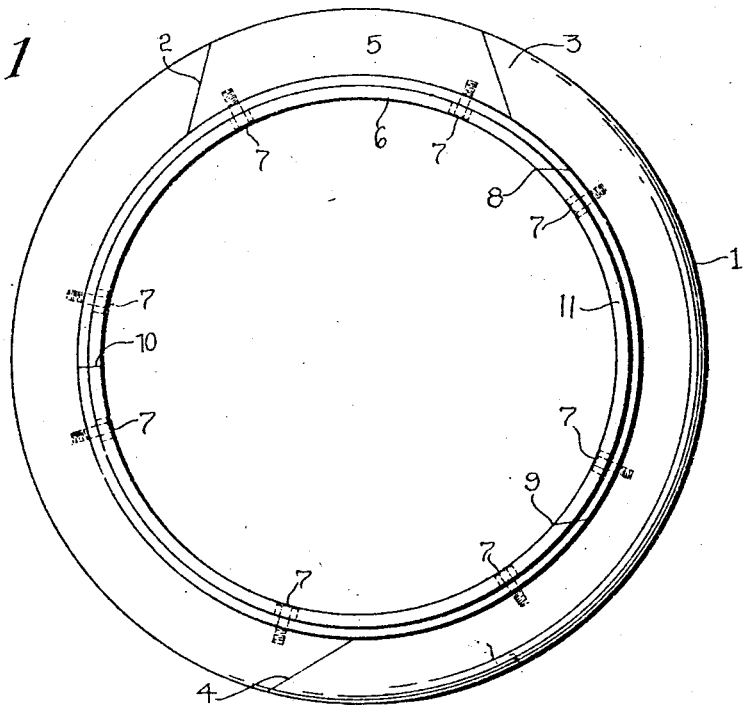

C. H. SEMPLE.
APPARATUS FOR MAKING TIRES.
APPLICATION FILED MAR. 7, 1911.

1,034,372.

Patented July 30, 1912.
2 SHEETS—SHEET 1.

WITNESSES
Robert M. Sutphen
R. F. Steward

INVENTOR
Charles H. Semple
by W. P. McElroy
Attorney

C. H. SEMPLE.
APPARATUS FOR MAKING TIRES.
APPLICATION FILED MAR. 7, 1911.

1,034,372.

Patented July 30, 1912.
2 SHEETS—SHEET 2.

WITNESSES
Robert M. Sutphen
R. F. Steward

INVENTOR
Charles H. Semple
K. P. McElroy
Attorney

UNITED STATES PATENT OFFICE.

CHARLES H. SEMPLE, OF TRENTON, NEW JERSEY.

APPARATUS FOR MAKING TIRES.

1,034,372. Specification of Letters Patent. Patented July 30, 1912.

Application filed March 7, 1911. Serial No. 612,812.

*To all whom it may concern:*

Be it known that I, CHARLES H. SEMPLE, a citizen of the United States, residing at Trenton, in the county of Mercer and State of New Jersey, have invented certain new and useful Improvements in Apparatus for Making Tires, of which the following is a specification.

This invention relates to apparatus for making tires; and it comprises a core mandrel, preferably sectional, the sections being of such shape as to allow the assemblage to be collapsible, a sectional flange ring having plane-surfaced lateral flanges extending as far as the edge of the base of the tire to be made, bolting means for securing said flange ring to the mandrel core, and flexible fabric pads of a contour adapting them to fit said flange ring and the margin of a tire on said mandrel and when so fitted to give the assemblage a rounded outline free of reëntrant angles and permitting a constricting pressure; all as more fully hereinafter set forth and as claimed.

In the curing or vulcanization of rubber it is observed that the effect is quite different when the rubber is in contact with metal and when it is not so in contact, and it is desirable to avoid the type of cure resulting on contact with metal for the outer or wear surface of the tire. In making a tire, it is usually formed on a metal mandrel of appropriate section, being built up of layers of fabric and rubber, rubber surfaced or "frictioned" fabric being largely employed. After the tire is built up on the mandrel in the usual practice, it is partially or wholly inclosed in an external metal mold used heretofore. The metal mold always extends up above the edges of the tire, giving a lateral contact therewith and is usually made of a pair of metal sections which are screwed or bolted into place in such a manner as to produce considerable pressure upon the sides of the tire. Frequently these external molds only extend a fraction of the total height of the tire, covering the tire edges and more or less of the body, but leaving the tread portion exposed. A short-height mold of this character has the advantage that the tread of the tire can be given what is termed an "open cure"; that is, exposed to direct steam in vulcanizing. After assembling the side metal molds with the tire, the whole assemblage is wrapped with cotton or other cloth tape or fabric and the whole exposed to steam for vulcanization or curing. The steam permeates the cloth wrapping and gives the "open cure" to the tread of the tire; a type of cure which is desirable for the exterior or wear surface of the tire. But the sides and edges of the tire within and in contact with the metal mold under the same conditions receive a different "cure" and without the use of great precaution in all details of the operation, there is apt to be considerable difference in the rubber above and below the line to which the side mold extends. Uniformity of cure in this method is difficult to secure and there is apt to be a considerable proportion of "seconds," that is, second quality tires. Another difficulty of this method of operation is that in building up the tire of layers of rubber and fabric, or frictioned fabric, (rubber coated fabric) irregularities in thickness are apt to occur and whatever the pressure of the side molds on the tire, these irregularities are not altogether taken up, leading to the formation of blisters and other defects. And there is of course always an unsightly line or seam between the open-cured portion of the tire and the portion which was in contact with metal. The open cured portion shows the fabric impression of the wrapping tape, the other portion shows the surface of the metal; and since the tape is not unyielding while the metal mold is stiff and inexpansible, the open cured portion generally projects laterally somewhat beyond the line of the mold-cured portion. This projection of the upper portion of the tire is enhanced by the fact that the constriction of the tape, which is generally tightly wound around the assemblage, tends to flatten down the tread somewhat and produce a lateral bulge or overhang at the point where the side metal molds stop. Furthermore, with the usual type of mold employing metallic pressure rings to laterally confine the beads and adjacent outer surfaces of the casing, it is impossible to get uniform pressure over the entire exterior surface of the tire casing, and consequently uniformity of cure is impossible for this reason as well as for those before mentioned. Metallic presssure rings rigidly clamped against the beads and sides of a tire give a fixed unyielding pressure, while the fabric wrappings exert a yielding pressure on the tread surface without, of course, in any way influencing the lateral pressure of the metallic rings. Only by chance can the flexible or yielding pressure of the fabric wrappings approximate that of the pressure rings. The wrappings moreover exert a radial pressure, or at least a pressure normal to the curve of the surface with which they contact, while the pressure of the rings is substantially at right angles to the plane of the tire periphery. This lack of uniformity in pressure manifests itself in the varying character of the curved rubber surface. The line of demarcation between the surfaces curved under the different pressures is clearly discernible, and injures the appearance of the finished tire.

In the present invention, I have found that by changing the method of operation I am able to secure better results, giving a better and more uniform tire with a much less proportion of faulty products. In lieu of using stiff, unyielding metal side molds compressed laterally against the edges and body of the tire, and curing with these molds in place, I give the tire the desired contour on the mandrel and then pad it with flexible pads of suitable non-metallic material adapted to fit against the tire beads and to engage the mandrel flanges in such a manner as to give the whole assemblage a regular outer contour free of reëntrant angles. With these yielding pads in position, upon winding the assemblage with cotton or other cloth strips, the whole exterior surface of the tire is under the same conditions as regards the constricting pressure of the inclosing wrapping strips, and the whole will cure alike. The strips are usually put on wet and contract somewhat by drying when the tire is exposed to steam heat, giving a uniform degree of constriction over the whole outer surface of the tire with the aid of the flexible pads which bear yieldingly against the sides of the tire from the edges some distance upward along the tire body. Where tape extends over side metal molds, of course the constricting pressure is limited to the top or tread portion of the tire; that is, there is no such uniform constrictive pressure over the whole outer surface of the tire shoe or casing as is produced in the present method. The pads I usually make of fabric frictioned with rubber as this when cured gives about the right amount of flexibility for my purposes; while at the same time, pads so formed have the strength and resistance to deformation requisite to hold the tire firmly against the mandrel without permitting any change in the shape of the tire. These pads, not being metallic do not give the different curing resulting from metal molds pressed into contact with the edges of the tire; the cure of the portion of the tire with which they contact is an open cure like that of the tread of the tire. The permeation of heat inward to the tire through the pads from the steam is like that through the cloth wrapping strips and unlike that through metal. I usually provide the mandrel with short lateral flanges extending to the outer edges of the tire beads. Each pad may be, and advantageously is, so contoured as to have a lug fitting beneath a flange of the mandrel, thereby retaining the pad in place. The bottom of each pad should be rounded so as to make it possible to wrap tape around the whole assemblage and produce an even degree of constricting pressure upon all portions of the tire above the base; that is, upon all portions of the sides and top of the tire. In this method of operation no portion of the tire which is exposed in use is cured in contact with metal. The contact of metal with the tire is confined to the interior chamber and the base of the tire.

In practice in an advantageous embodiment of my invention, I provide a metal annulus or core, which may be hollow or solid as may be preferred. This annulus I make of several sections, four being a convenient number, with corresponding ends so shaped as to allow the sections to be arranged in arch-like engagement, the several sections readily yielding inwardly when it is desirable to disassemble the core, as in removing from the finished tire. To hold these sections in place, I use a sectional flat annular band sufficiently wide to furnish a projecting lateral flange on each side of the core for the support of the base of the tire. This band may be in any desired number of sections, three being a convenient number, and may be bolted or screwed to the core to hold it together during the tire making operation. With a three-section band, one of the joints may be butt-to-butt and the other two lap or bevel joints. The lateral flanges should reach approximately to the outer edges of the base of the tire but should not project upward over such edges. Using such a collapsible core or mandrel, frictioned fabric and uncured rubber are placed on it to form a tire body of the desired character, contour and thickness. The bead of the tire may be formed at the same time; or a perforated bead of semi-cured rubber, rubber and wire, etc., may be used. The tire in position on the mandrel may now be compressed to compact it and perfect the external outline or contour. After release of the pressure, the shaping fabric pads are applied. These pads may be made by taking strips of frictioned fabric and building up an assemblage of layers which on one side will fit accurately against the bead and body portion of the tire and the side of the flanged annular band, and on the other will have an outline such that when applied to the tire, the whole assemblage will be given an outline free of reëntrant angles, allowing a wrapping of fabric strips, tapes or "rags" around the assemblage in such manner as to produce an even constricting pressure over the whole tire. These wrapping strips or tapes of cotton or the like are next applied, and the assemblage open-cured by exposure to steam. As only the base of the tire or that portion which rests on the flanges of the mandrel is in contact with metal, the whole exterior of the tire, or the portion exposed in use, will have the same type of cure and it will all bear fabric markings and will be practically free of any seam or line of demarcation between the upper and lower sides of the tire.

In the accompanying illustration I have shown, more or less diagrammatically, certain embodiments of means for performing the described process.

Figure 2:
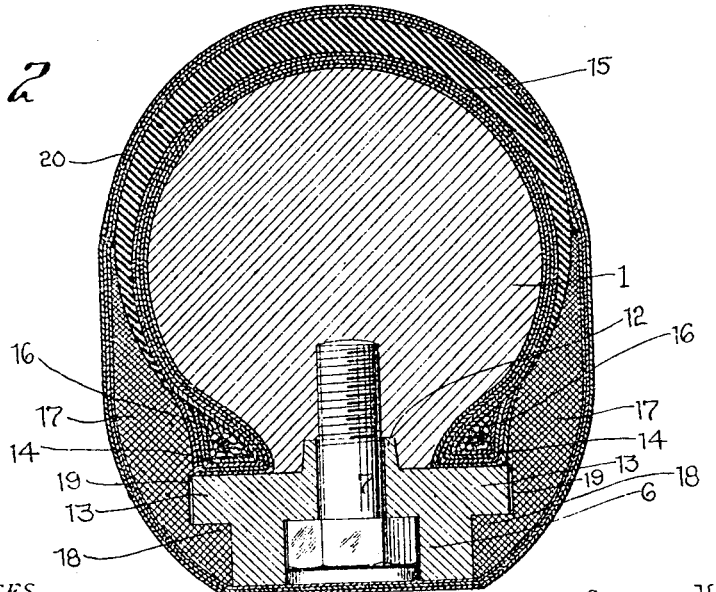
Figure 3:
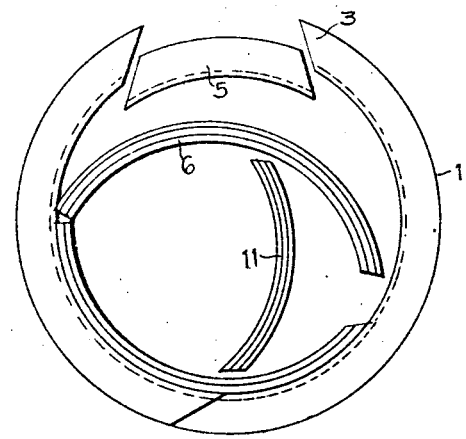
Figure 4:
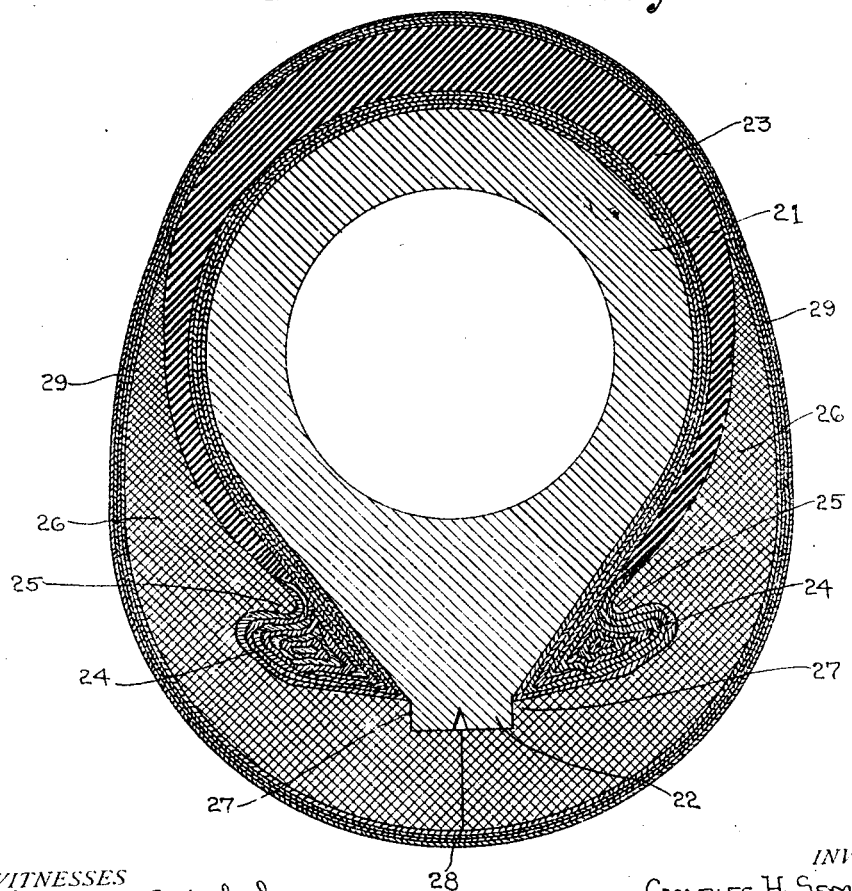

In this showing, Figure 1 is a side elevation of the assembled mandrel or core; Fig. 2 is a cross section of the assembled mandrel, tire casing, pads, and wrappings, ready for vulcanizing; Fig. 3 shows the collapsible mandrel partly collapsed; and Fig. 4 is a cross section of a modified form of apparatus.

Referring to Figs. 1 and 2, 1 is an annular core or mandrel, which may be solid as shown, or hollow if preferred, and which has an outer contour complementary to that of the inner surface of a finished tire shoe or casing. Joints as at 2, 3, and 4, divide the core into any number of sections, at least one of which, such as 5, should be capable of being withdrawn from the periphery inwardly toward the center of the annulus. Annular band or flange ring 6 is concentric with the core and removably secured thereto by bolts 7, said band being divided into any convenient number of sections by joints as at 8, 9, and 10, and one of the band sections, as 11, being withdrawable inwardly as in the case of the core. The bolt heads are best countersunk in the flange ring as shown. The sections of the annular band are best arranged to "break joints" with the core sections. Annular rib 12 on the outer periphery of the removable band registers with a corresponding annular slot in the core and serves as centering means. Laterally extending flanges 13 having plane upper surfaces afford basal support for beads 14 of tire case 15 mounted on the mandrel. The tire casing shown in Fig. 2 is the straight side type, having beads reinforced by inextensible members 16. Flexible annular pads, 17, of non-metallic material have their upper portions shaped to conform to the contour of the mounted tire casing and its beads and extend upwardly from above the beads to cover a portion of the sides of the casing, while shoulders 18 engage the under side of the flanges of the removable bands. It is well to so proportion these pads, that when assembled with the mandrel and tire casing there may be a small clearance as at 19 between such pad and the flange, in order to permit uniform distribution of pressure of the pads against the tire casing. The outer surface of the pads is most conveniently of such a contour that when the parts are assembled, the outline of the whole assemblage is substantially that of a flattened ellipse. With such a contour, wrappings 20 of textile fabric or other pervious non-metallic material suitable for the open cure vulcanization are readily wound around the assemblage to put the whole exterior of the tire under the same degree of constrictive pressure.

The method of using the above described apparatus is obvious from the foregoing. The sections of the collapsible core having been assembled to form an annulus, the parts are then held in place by securing the sections of the flanged centering band to the core by means of the fastening bolts. The tire casing is then built up on the core in the usual way, the beads of the tire being basally supported on the band flanges. When the building-up process is complete, the tire casing is firmly pressed against the mandrel by suitable shaping means to insure close contact therewith at all points and to give a uniform contour to the tire exterior. The flexible annular pads are next fitted against the sides of the tire, and against the sides and lower surfaces of the band flanges. The whole assemblage is then incased in material which permits open cure vulcanization; and this is best accomplished by tightly winding strips of wet textile fabric around the entire annulus. The wrapped assemblage is next subjected to vulcanizing conditions, steam treatment being the best method to employ. Under these conditions, the wet wrappings shrink, and owing to the flexibility of structure given by the lateral pads, a uniform constrictive pressure is transmitted to every portion of the outer surface of the tire casing. Unlike metal elements rigidly held in position, the pads are free to adjust themselves. Furthermore, the permeability of the pads to "open cure" heat, gives a uniform cure over the entire outer surface of the case, such as is impossible to obtain where such surface is in contact with or confined by metal, and the fabric markings are uniformly distributed over the tire surface from bead to bead without an unsightly difference between the top and bottom of the tire or an unsightly bulge, seam or blister at any point.

After the vulcanization is completed, the wrappings and the flexible pads are removed. Securing bolts 6 are then removed and section 11 of the centering band is easily withdrawn inwardly toward the center of the circle. This permits the remaining sections of the band to be removed, and section 5 of the core to be withdrawn from the tire casing without difficulty. The method of disassembling the parts is clearly shown in Fig. 3. The tire casing is now readily stripped from the remaining sections of the collapsible core.

In applying my new process to clencher tires, the modified type of core and pads shown in Fig. 4 is conveniently employed. In this showing, 21 is a core having a centering rib 22. Tire casing 23 provided with clencher beads 24 and grooved at 25 is built up on the core, and is then laterally and basally confined and held in position against the core by annular flexible pads 26, of suitable non-metallic material as before described. The surfaces of these pads next the tire are shaped to fit closely the entire outer surface of the tire, including the tire base. Suitable shoulders 27 engage the centering rib of the core, and the lower edges of the pads are in approximate abutment at 28. The outer contour of the pads is such that when they are assembled with the core and tire, the contour of the assemblage is smoothly continuous and substantially elliptical in cross section, enabling the ready and efficient application of the wrappings 29, which, as before, are best composed of cotton or other cloth strips. The core may be non-collapsible or collapsible according as the tire beads are extensible or not. In the showing of Fig. 4, the core is non-collapsible.

In carrying out my invention according to the method and employing the form of apparatus last described, the entire outer surface of the tire, including the under surfaces or base of the beads, is subjected to the desirable open cure vulcanization with all its attendant advantages. Only the inner surface of the tire comes in contact with metal.

What I claim is:—

1. In apparatus for forming a tire casing, a sectional metal mandrel having a contour suitable for the interior of the tire, the joints between the several sections being such as to permit inward disassemblage while resisting outward disassemblage, a sectional locking ring member having plane-faced lateral flanges extending outward the width of the tire bead base, the joints between the several sections also being such as to permit inward disassemblage, attaching means for securing the locking ring to the mandrel and a pair of contoured fabric pads, said pads on one side fitting said flange and the tire beads and on the other having a face adapted to form a continuous line with the tire tread and side substantially free of reëntrant angles.

2. In apparatus for forming a tire casing, a sectional metal mandrel having a contour suitable for the interior of the tire, the joints between the several sections being such as to permit inward disassemblage while resisting outward disassemblage, a sectional locking ring member having plane-faced lateral flanges extending outward the width of the tire bead base, the joints between the several sections also being such as to permit inward disassemblage, attaching means for securing the locking ring to the mandrel and a pair of contoured pads of frictioned fabric, said pads on one side fitting said flange and the tire beads and on the other having a face adapted to form a continuous line with the tire tread and side substantially free of reëntrant angles.

3. In apparatus for making tire casings, a mandrel having an upper portion shaped to fit the interior of a finished tire casing and having lateral bead-supporting flanges with plane upper surfaces, and flexible non-metallic pads adapted to engage said flanges and to laterally confine the beads of a tire casing.

4. An apparatus for making tire casings, comprising, in combination, a substantially rigid core or mandrel, and flexible non-metallic pads adapted to laterally confine a tire casing mounted on said mandrel.

In testimony whereof, I affix my signature in the presence of witnesses.

CHARLES H. SEMPLE.

Witnesses:
 A. BOYD MESS,
 N. S. CONOVER.